UNITED STATES PATENT OFFICE.

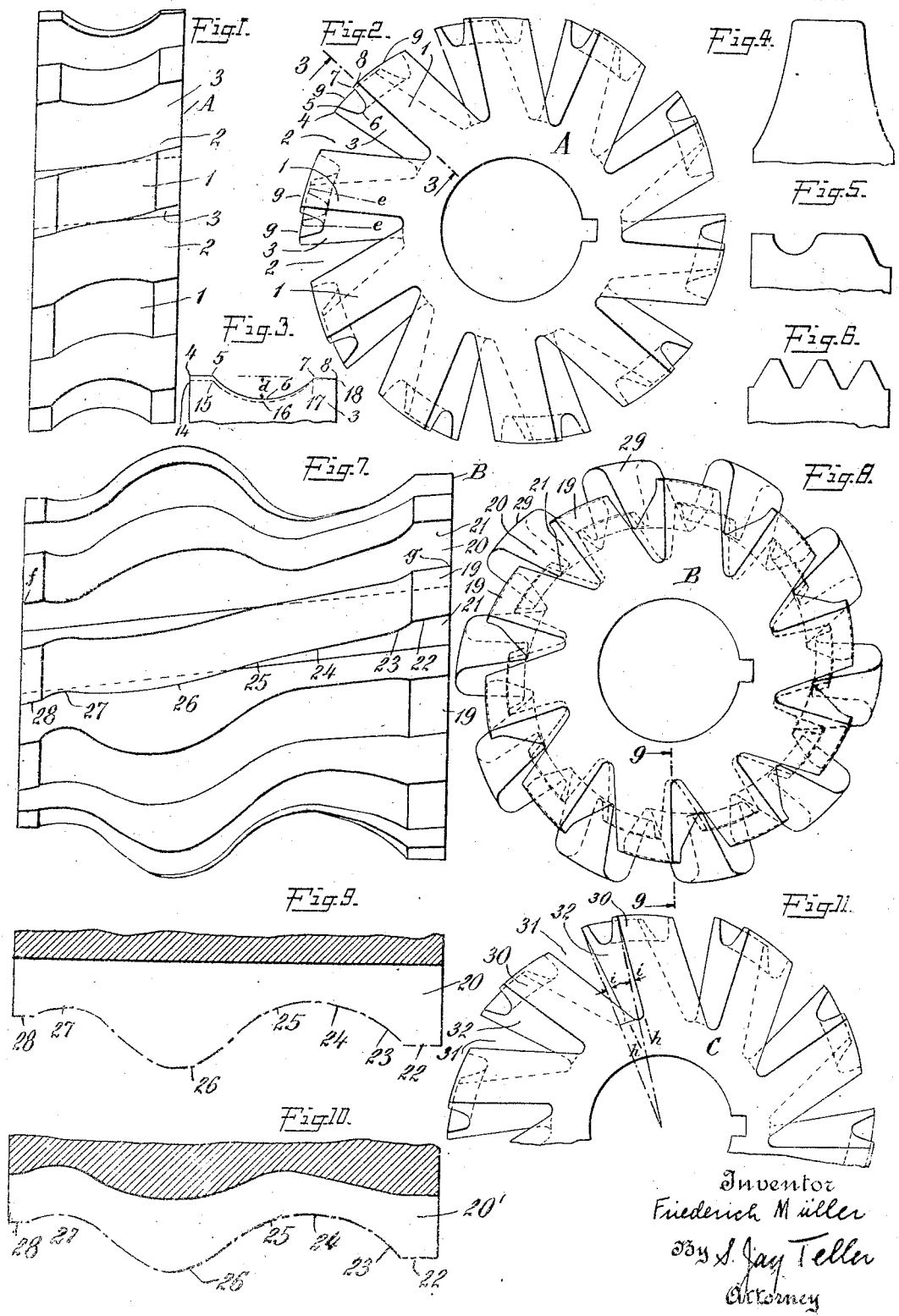

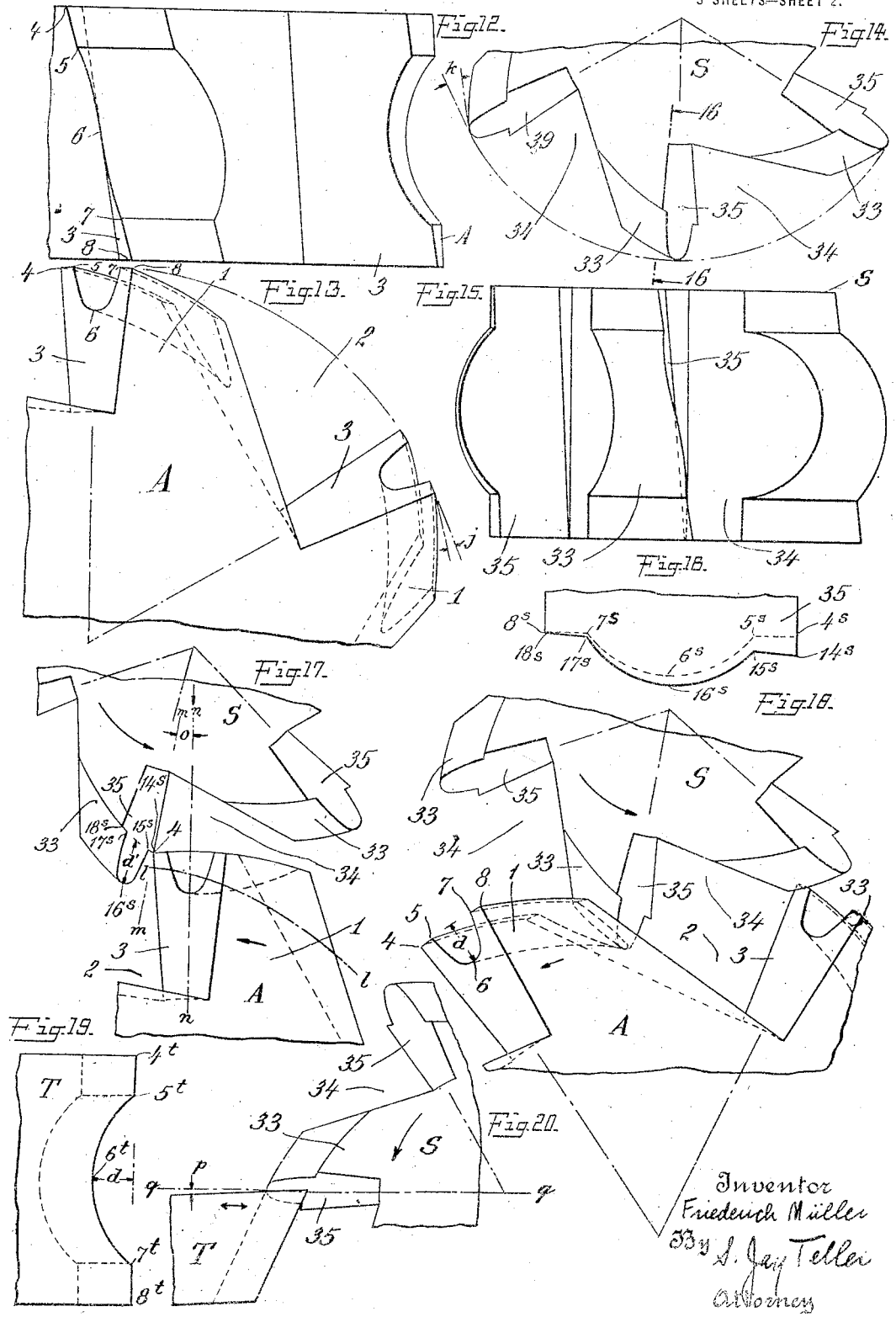

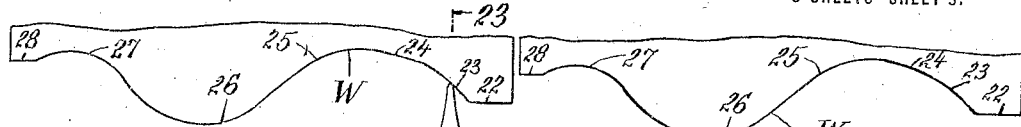
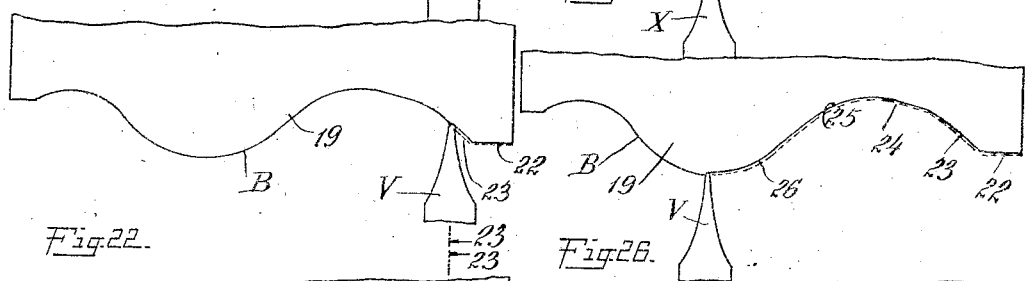
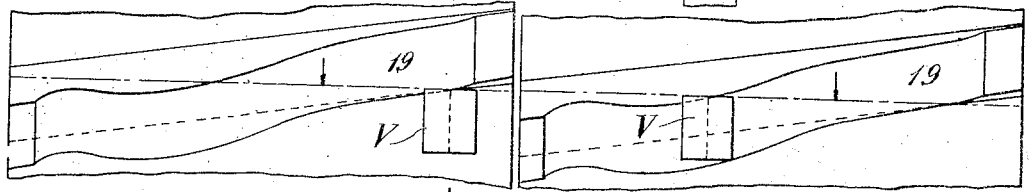
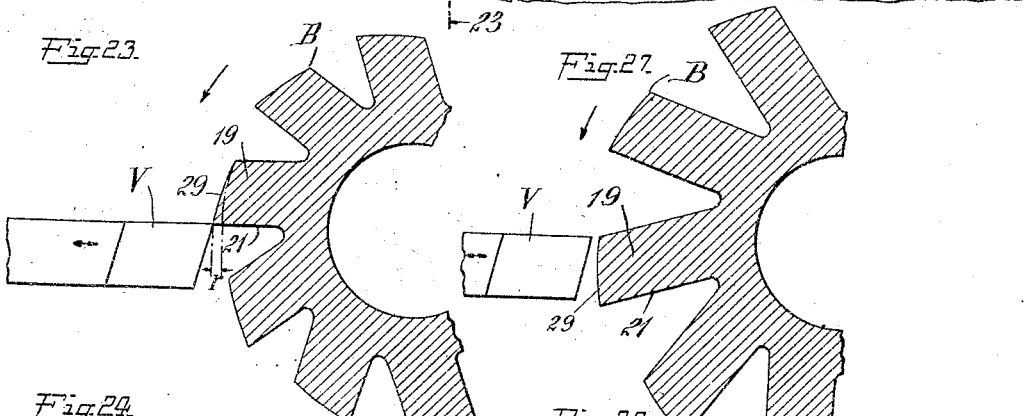
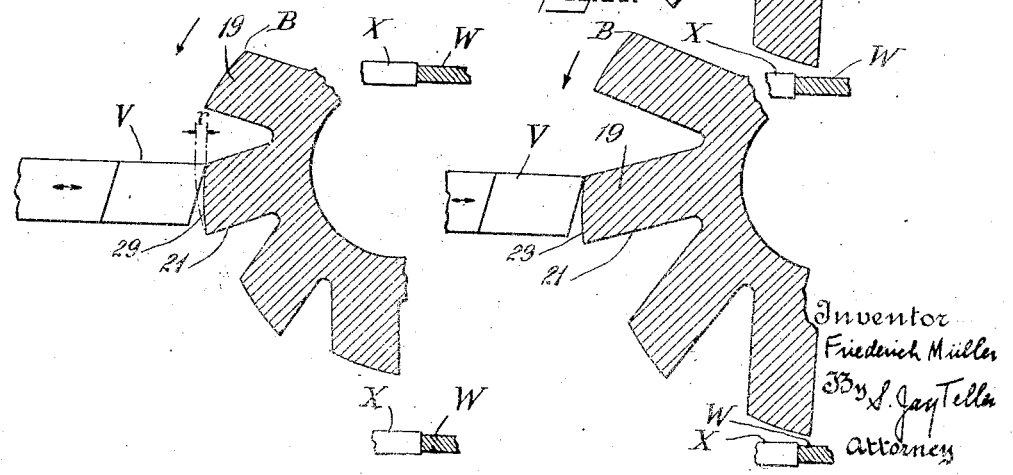

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MILLING-CUTTER.

1,348,295.

Specification of Letters Patent. Patented Aug. 3, 1920.

Application filed December 26, 1918. Serial No. 268,349.

*To all whom it may concern:*

Be it known that I, FRIEDERICH MÜLLER, a citizen of the United States, residing at Hartford, in the county of Hartford and State of Connecticut, have invented certain new and useful Improvements in Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

Prior to my invention, it had not been deemed practical or possible to apply this principle to accurately made and properly relieved formed or contour cutters. By a formed or contour cutter I mean one in which the diameter varies from end to end in ways differing from a uniform taper, the cutter being thus adapted to cut a predetermined contour other than a straight line.

The principal object of the present invention is to provide a formed milling cutter which is properly relieved and which is adapted to accurately cut a predetermined contour and which has its cutting edges longitudinally inclined with respect to the axis for the purposes set forth. A further object of the invention is to provide a cutter of the kind set forth which is adapted to cut a contour exactly the same as any predetermined contour on an initial guide or former. A still further object of the invention is to provide a milling cutter of the type specified which can be ground on the front faces of the teeth without changing the form thereof. Other objects will be apparent from the following specification and claims.

As to a part of its subject matter this application constitutes a continuation of my abandoned application for milling cutters and methods of making, Serial No. 231,796 filed May 1st, 1918, and as to another part of its subject matter this application constitutes a continuation of my copending application for methods of making milling cutters, Serial No. 248,190 filed August 3rd, 1918.

In the accompanying drawings I have shown different forms of cutters embodying the invention but it will be understood that the drawings are for illustrative purposes only and are not to be construed as defining or limiting the scope of the invention, the accompanying claims being relied upon for that purpose. It will be particularly understood that the contours of the cutters shown have been selected merely by way of example and that any practical contours may be substituted for those shown. In order that the invention may be thoroughly understood I have also illustrated methods by which the cutter may be made.

Of the drawings:

Figures 1 and 2 are side and end views respectively of a formed milling cutter embodying the invention.

Fig. 3 is a diagrammatic view illustrating certain features of the cutter shown in Figs. 1 and 2.

Figs. 4, 5 and 6 are diagrammatic views showing typical contours with which the cutter may be formed.

Figs. 7 and 8 are side and end views respectively of a somewhat differently formed milling cutter embodying the invention.

Fig. 9 is a developed fragmentary cross sectional view of the cutter shown in Figs. 7 and 8, the section being taken through the bottom of one of the longitudinal grooves along a helicoidal surface such as 9—9 indicated in Fig. 8.

Fig. 10 is a view similar to Fig. 9 but illustrating a slightly modified form of cutter.

Fig. 11 is a view similar to Fig. 2 but showing a somewhat different formed milling cutter embodying the invention.

Figs. 12 and 13 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Figs. 14 and 15 are enlarged diagrammatic end and bottom views respectively of a preliminary milling cutter which may be used for making the cutter shown in Figs. 12 and 13. The cutter is shown as having a smaller number of teeth and as having increased inclination and relief in conformity with the increased inclination and relief shown in Figs. 12 and 13.

Fig. 16 is a diagrammatic view illustrating certain features of the cutter shown in Figs. 14 and 15.

Fig. 17 is a diagrammatic view illustrating the preliminary milling cutter shown in Figs. 14 and 15 in use for milling a blank for the final cutter shown in Figs. 12 and 13, the milling operation having been started but not finished.

Fig. 18 is a view similar to Fig. 17 but showing the milling operation completed.

Fig. 19 is a plan view of a lathe tool adapted to be used in cutting the preliminary cutter.

Fig. 20 is a fragmentary end view illustrating the tool shown in Fig. 19 in use for cutting the preliminary cutter shown in Figs. 14 and 15.

Fig. 21 is a diagrammatic plan view showing one step in the making of the cutter shown in Figs. 7 and 8. A lathe tool is shown in engagement with a cutter blank.

Fig. 22 is a fragmentary front view of some of the elements shown in Fig. 21.

Fig. 23 is a diagrammatic sectional view taken along the lines 23—23 of Figs. 21 and 22.

Fig. 24 is a view similar to Fig. 23 but showing the parts in different relative positions.

Figs. 25 and 26 are views similar respectively to Figs. 21 and 22 but showing the lathe tool in a different position.

Figs. 27 and 28 are diagrammatic views somewhat similar to Fig. 24 and illustrating the relations between the lathe tool and the cutter blank when the lathe tool is in the general position shown in Figs. 25 and 26.

Referring to the drawings, particularly to Figs. 1 to 6 thereof, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, as shown, the entire teeth 1 are oblique or inclined, and not merely the front cutting faces 3 thereof. As concerns the broader phases of the invention, I do not narrowly limit myself in regard to the nature of the inclination of the teeth 1 or in regard to the character of the front walls or cutting faces 3, but preferably each tooth 1 is generally helical in form and each cutting face 3 conforms to a helicoid. As illustrated in Figs. 1 and 2 the helicoid is one formed by a generatrix following the axis of the cutter and also following a helix on a cylinder concentric with the axis thereof, the helicoid in this case being radial. The character of the helicoid may, however, be varied, especially in the manner to be set forth hereinafter. The teeth and the cutting faces may be inclined in either direction and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter shown in Figs. 1 and 2 is adapted for cutting the contour shown by full lines in Fig. 3, this contour consisting of straight end portions and a concave central portion conforming to a circular arc and having a depth $d$. It will be understood that this particular contour has been selected merely for purposes of illustration and that the contour can vary in any practical way that may be desired, the invention being particularly applicable however to a cutter having a curved contour. Typical contours are shown in Figs. 4, 5 and 6, and it is to be understood that it may be necessary to modify the cutter, as concerns size, number of teeth, etc., in accordance with the contour selected.

The outer edge of each cutting face 3 has an outline which is shaped to cut the predetermined contour when the cutter is rotated, this outline of the cutting face following the helicoidal surface thereof. For the particular contour illustrated, the four points 4, 5, 7 and 8 on the outline of the cutting face are all at equal distances from the axis of the cutter; the central point 6 is at a distance from the axis which is less by the distance $d$; and all other points along the outline are at their respective correct distances from the center so that when the cutter is rotated they will define the correct predetermined contour, as shown by full lines in Fig. 3. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the warped or helicoidal cutting face. Preferably the relief lines 9 are maintained in similar relationship to each other as they extend backward and inward, the lines preferably conforming to spirals of Archimedes. The result is that each tooth of the cutter, at any axial plane of intersection, such as 3—3, has a distorted shape, as shown by dotted lines in Fig. 3. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as e—e, back of an initial cutting face 3 and similar to the said face, the same effective contour will be found. Therefore if the cutter is ground on the front faces to helicoids which are the same as the helicoids of the initial cutting faces the effective contour will remain the same.

In Figs. 7 to 10 I have shown a cutter B which is similar to the cutter A but which differs therefrom in being considerably longer. The cutter is provided with a plurality of generally longitudinal but inclined teeth 19 between which are grooves 20. The teeth have substantially radial front cutting faces 21 which conform to helicoids and which have outlines corresponding to the contour to be cut. The contour illustrated, has been selected merely for purposes of illustration, and can be changed as desired. It consists of a straight section 22 parallel with the axis, a concave section 23 in the form of a circular arc, a straight section 24 inclined with respect to the axis, a concave section 25 in the form of a circular arc, a convex section 26 in the form of an elliptical arc, a concave section 27 in the form of a circular arc, and a straight section 28 parallel with the axis. The grooves 20 can be of any usual or preferred depth or shape as required by the spacing and by the depth of the contour. As illustrated in Fig. 9, each groove 20 has a uniform depth throughout; that is, its bottom is parallel with the axis of the cutter. It may, however, be preferable to vary the depth of the groove so that it may conform in a general way to the external contour of the cutter. Such a groove of variable depth is shown at 20' in Fig. 10. Each tooth is provided with spiral relief along lines 29 and the cutter can be ground on the helicoidal cutting faces without changing the effective contour. As concerns most of its important features the cutter B is similar to the cutter A, and for this reason further detailed description can be omitted.

The two cutters A and B may be distinguished by the fact that in the cutter A the forward outer corner of each tooth is considerably behind the opposite rear outer corner of the next preceding tooth whereas in the cutter B the forward outer corner $f$ of each tooth overlaps the opposite rear outer corner $g$ of the next preceding tooth. This difference is an important one as, on account of it, the cutter A can be made by methods that are not adapted for the cutter B. On the other hand the cutter B has important advantages, one of which is that it can be made of any reasonable length. A cutter such as A is limited in length by the width of the grooves 2 between the teeth, whereas a cutter such as B can be much longer as the teeth are permitted to overlap.

I have described the cutters A and B as having radial cutting faces, and I have stated that each cutting face preferably conforms to a helicoid formed by a generatrix following the axis of the cutter and also following a helix on the outline of the cutter. If desired, there can be variation from this form of helicoid and the helicoid can be one formed by a generatrix following the aforesaid helix on a cylinder concentric with the axis and also following a helix of the same longitudinal pitch on a smaller concentric cylinder. A cutter C with such cutting faces is illustrated in Fig. 11. The cutter has teeth 30 with grooves 31 between them. It will be seen that the front cutting faces 32 of the teeth 30 are "undercut"; that is they are so formed that planes perpendicular to the axis of the cutter will intersect, not along radial lines, but, along lines such as $h$, $h$ each at an angle such as $i$ to the corresponding radius. This cutter C is illustrated as being otherwise similar to the cutter A but it will be understood that this is merely by way of example. An undercut cutter may be made which is otherwise similar to the cutter B.

Notwithstanding the inclination of each cutting face of the cutter C with respect to the radii, the several points along the outline thereof are at exactly the same distances from the axis as are the respectively similar points on the outline of a cutting face of the cutter A. Therefore the cutter C has exactly the same effective contour as the cutter A and will cut the same predetermined contour. This inclining or "undercutting" of the cutting faces is preferable under some circumstances as it causes a more efficient cutting action. I do not herein present specific claims for the cutter C as this cutter is made the subject matter of my copending application for milling cutters, Serial No. 323,110, filed Sept. 11, 1919.

To assist in giving a more complete understanding of my invention, I will set forth certain methods by which my improved milling cutters may be made. The present invention is not limited by the method which may be used, and it will be understood that methods other than those described may be employed. I will first describe a method which is adapted for the making of the cutter A or the cutter C, and I will then describe a method which is adapted for making any of the cutters. It will be understood that with either method the preliminary steps of turning the blank, cutting the grooves therein, etc., can be carried on in any usual or preferred way, these steps not requiring any special description.

The method that I will first describe for making the cutter A is one which is presented and claimed in my copending application for methods of making milling cutters, Serial No. 268,350 filed on even date herewith. I will herein confine myself to a brief description of a simple form of the said method, as shown in Figs. 12 to 20, reference being made to the said application for a more detailed description and for descriptions of possible variations of the method. For convenience in explaining the method I have shown the cutter A somewhat diagrammatically and on a larger scale in Figs. 12 and 13. The number of teeth is reduced and the inclination of the cutting faces and the relief are somewhat increased.

In practising the method use is made of a preliminary rotating milling cutter which is used to form the shape of the final milling cutter. In Figs. 14 to 16 I have shown diagrammatically a preliminary milling cutter S which may be used for shaping the final cutter A, as shown in Figs. 12 and 13. The cutter S is provided with generally longitudinal teeth 33 which are separated by grooves 34 and which have front cutting faces 35. Each tooth of the preliminary cutter S has at any axial plane of intersection such as 16—16, a shape which is the same or approximately the same as the predetermined contour, as shown by dotted lines in Fig. 16. While the contour is the same, it is reversely positioned with respect to the axis, the points which are outermost on the final cutter being innermost on the preliminary cutter and vice versa. The points along this plane of intersection are indicated by $4^s$, $5^s$, $6^s$, $7^s$ and $8^s$, these corresponding respectively to the points 4, 5, 6, 7 and 8 on the effective contour of the final cutter A.

The front cutting faces 35 of the teeth 33 of the cutter S are helicoidal in form and have the same longitudinal pitch or lead as the helicoidal faces 3 of the teeth 1 of the cutter A. The cutting faces of the teeth of both cutters are inclined in the same direction. The preliminary cutter S is preferably much smaller in diameter than the final cutter, and therefore there is an apparent difference in the helicoidal surfaces of the two cutters. While the helicoids are in reality the same, being determined by the same or similar directrices, the actual angle of inclination is less for the preliminary cutter S than for the final cutter A because of the smaller diameter. The actual angle of inclination of the cutting face of the preliminary cutter is immaterial, and therefore the diameter of the preliminary cutter S can be varied as desired without interfering with the practice of the method.

Each tooth 33 of the preliminary cutter S has a degree of relief which is the same as the degree of relief of the teeth of the final cutter. The "degree of relief" in each case is represented by the ratio between the angular advance of the cutter and the corresponding decrease in radius. The decrease in radius for each angular increment of advance of the cutter S is the same as the decrease in radius for each angular increment of advance of the cutter A. While the degrees of relief are the same for both cutters, there is an apparent difference because of the smaller diameter of the cutter S. The relief lines meet the circumferential lines at a relatively small angle such as $j$ for the cutter A and at a relatively large angle such as $h$ for the cutter S, but it will be remembered that the degrees of relief are the same, as before explained.

As the result of providing the preliminary cutter S with the same helicoidal cutting faces and with the same degree of relief as the final cutter A, the front outline or effective contour of each tooth is distorted, as shown by full lines in Fig. 16. The points $14^s$, $15^s$, $16^s$, $17^s$ and $18^s$ along the distorted outline correspond respectively to the points $4^s$, $5^s$, $6^s$, $7^s$ and $8^s$ along the shape at an axial plane of intersection. The several points $17^s$, $16^s$, $15^s$ and $14^s$ to the right of the point $8^s$ or $18^s$ are spaced outward from the respective points $7^s$, $6^s$, $5^s$ and $4^s$ by progressively increasing distances. The actual inclination of each cutting face is less by reason of the smaller diameter but the amount of relief is more for the same reason, and these differences exactly compensate for each other. The result is that the distortion of the outlines $14^s$, $15^s$, $16^s$, $17^s$, $18^s$ of the teeth of the cutter S is exactly the reverse of the desired distortion 14, 15, 16, 17, 18 of the teeth of the final cutter A along axial planes of intersection, the two distortions being exactly the same in extent.

Figs. 17 and 18 show the preliminary cutter S in use for milling the final cutter A. It will be understood that the cutter S is rapidly rotating in the direction indicated by the arrow thereon; that the blank A is slowly rotating in the direction indicated by the arrow thereon; and that relative approaching and receding movements are effected between the cutter and the blank in timed relation to the blank rotation to provide the required relief on the final cutter. These relieving movements are preferably effected by moving the axis of the cutter bodily toward the axis of the blank, as indicated by the vertical arrow, and then bodily away from the axis of the blank in the opposite direction. Preferably the downward or inward relieving movement is so timed that the resulting relief on the blank will conform to spirals of Archimedes. The cutter S is moved slowly downward during the cutting of each tooth and then is rapidly moved upward between the teeth to position it for the cutting of the next tooth.

As shown in Fig. 17, the cutter S and the blank A have been so adjusted that the teeth 33 of the rotating cutter S will mill the initial point 4 of the tooth 1 of the blank A to the required distance from the axis. The downward movement of the cutter S in timed relation to the slow rotation of the blank A causes it to take a cut which gradually increases in depth at the successive points 5, 6, 7 and 8 back of the point 4. This action is continued till the relative position shown in Fig. 18 is reached. In this milling action the distorted shape of the cutter S causes the desired distortion in the shape of the cutter A. The cutter S shapes the cutter A with the several points 4, 5, 6, 7 and 8 all at the proper distances from the axis, so that the cutter A when used will cut the true predetermined contour, as shown by full lines in Fig. 3.

Referring to Fig. 17, it will be noted that the dot-and-dash line $l—l$ represents in a general way the direction of relative movement of the cutter S in forming the relieved outline of the tooth on the cutter A. As the cutter S is rapidly rotating, its plane of maximum depth of cutting will necessarily be perpendicular to the line $l—l$. Cutting to the maximum depth of the contour will therefore be effected at a plane such as $m—m$ perpendicular to the line $l—l$. The transverse shape of the tooth of the cutter A will therefore be determined as the successive parts of the tooth pass the plane $m—m$. But when the cutter A is afterward used in a milling operation it will cut to its maximum depth and determine the contour of the body being cut at a plane such as $n—n$ passing through the axis. Clearly the planes $m—m$ and $n—n$ are not and cannot be parallel, there being an angle such as $o$ included between them. The depth distance $d$ of the final cutter A measured along the plane $n—n$ is slightly greater than the depth distance $d'$ of the preliminary cutter measured along the plane $m—m$. Therefore a slight error of shape results from the fact that the shape is generated at the plane $m—m$ and used at the plane $n—n$. This error is very slight and for many classes of work can be treated as entirely negligible. However, for work requiring the very highest degree of accuracy it may be desirable to correct this error. I do not limit myself to any one way of making the correction, but the error can conveniently be corrected by shaping the preliminary cutter in the way to be described.

Fig. 19 shows a lathe tool T having a contour $4^t$, $5^t$, $6^t$, $7^t$, $8^t$, which is exactly the same as the predetermined contour 4, 5, 6, 7, 8 which is to be finally cut by the cutter A. This tool is used in a relieving lathe to shape the preliminary cutter S as shown in Fig. 20. The tool T is tilted or set at an angle with its cutting face in a non-axial plane, an angle such as $p$ being included between the cutting face of the tool and an axial plane such as $q—q$. When the preliminary cutter is being formed it is rotated in the direction of the arrow, the tool T being moved in and out as indicated by the horizontal arrow so as to follow the proper relief lines. As before stated the depth $d$ of the contour measured along the plane $n—n$ will be slightly greater than the depth $d'$ measured along the plane $m$—$m$. In order to make the depth $d$ correct at the plane $n$—$n$, the depth $d'$ at the plane $m$—$m$ must be slightly decreased. In Fig. 20 the plane $q$—$q$ corresponds in a general way to the plane $m$—$m$, and by setting the tool at an angle, as indicated, the depth $d'$ of the contour at the plane $q$—$q$ is made slightly less than the full depth $d$ measured along the top plane of the tool T. From the foregoing description it will be seen that, by the method illustrated, the depth of the contour of the final cutter A at the plane $n$—$n$ is properly corrected.

For making the cutter C with undercut cutting faces a method may be followed which is similar to that shown in Fig. 19. In this case the angle $p$ is increased to compensate for the angle $i$ of the undercut faces. This method is fully disclosed in my copending application for methods of making milling cutters, Serial No. 323,111, filed September 11, 1919.

The method which has been described is not in its entirety applicable for making the cutter B for the reason that the teeth overlap. In the described method it is necessary for the teeth of the cutter to be spaced apart so as to enable the preliminary cutter to finish one tooth of the final cutter before engaging the next tooth. When the teeth of the final cutter overlap this is obviously impossible. The cutter B may be made by the method shown in Figs. 21 to 28, which is presented and claimed in my aforesaid copending application for methods of making milling cutters, Serial No. 248,190 filed August 3rd, 1918. It will be understood that this method is also applicable for making the cutter A or the cutter C.

In shaping the cutter use is made of a narrow lathe tool V, as shown in Fig. 21. For roughing out the cutter a relatively broad tool may be used, but for finishing it is preferable to use a tool provided with a fine point. The tool V is held in operative relationship with the blank B and is fed and guided, preferably toward the left, so as to follow the true contour 22—28. During the cutting operation the blank is axially rotated by any preferred means. The tool is preferably held in parallelism while being fed, and the feeding is preferably effected uniformly from one end of the blank to the other. The tool is preferably very narrow and the amount of feed for each revolution of the blank is less than the width of the tool. For guiding the tool V there is provided a former W having exactly the predetermined contour to be cut by the cutter B. The former is engaged by a pin X which has the same or approximately the same front outline as the tool V. The former pin and the tool are connected together for movement in unison.

Figs. 21 and 22 show the tool V in engagement with the blank, the section 22 and a part of the section 23 of the predetermined contour having already been cut. Fig. 23 is a cross sectional view through the blank and the former at the point of engagement of the tool with the blank and of the former pin with the former. The blank is in the position indicated in Fig. 22 and the tool V is shown engaging the front edge of a tooth 19. In order that the teeth of the cutter may be properly relieved, the tool V is reciprocated relatively to the former pin X toward and from the blank axis in timed relation to the blank rotation. As illustrated in Fig. 23, the blank is rotated in the direction indicated by the arrow and the tool is reciprocated through an effective distance $r$, the tool being given one complete movement forward and backward for each tooth of the blank. Fig. 23 shows the tool in its outer operative position and about to move inward to cut the relief on the tooth which has just come into engagement with it. Fig. 24 is a view similar to Fig. 23 but showing the cutter advanced so that the tool V is at the rear of the tooth 19. It will be clear that the tool has moved inward to its inner operative position and in so moving has formed the proper relief 29 on the tooth.

Figs. 25 and 26 are views similar to Figs. 21 and 22 but showing the tool V and the former pin X in different positions. It will be understood that the tool and pin in moving from the positions shown in Figs. 21 and 22 to the positions shown in Figs. 25 and 26 have been fed very slowly, the pin remaining in engagement with the former and thus properly guiding the tool. As shown the tool has cut the remainder of the section 23 of the predetermined contour, all of the sections 24 and 25, and a part of the section 26.

I have stated that the tool V is reciprocated in timed relation with the rotation of the cutter blank. This relation is definite with the tool at any given transverse plane, but when the tool is fed longitudinally of the cutter the relationship must be varied to conform to the changing angular position of the outer edge of the cutting face. Fig. 26 shows the cutter blank with the engaged tooth in the same position as in Fig. 22. On account of the inclination of the tooth the point of the tool is near the rear of the tooth instead of at the front thereof as was shown in Figs. 21 and 22. If the same relationship had been maintained between the rotation of the cutter blank and the reciprocation of the tool, the tool would be in the same outermost operative position which it occupied in Fig. 23, thus leaving it out of engagement with the blank, as shown in Fig. 27. Obviously, the relationship between the cutting tool and the blank must be varied in order to enable the tool to cut the necessary relief and at the same time maintain the correct contour. When the front edge of the tooth reaches the point of the tool, the tool must engage the blank and must thereafter continue in engagement as the tooth continues to move past it. The required variation in the relationship may be effected by relatively advancing the tool reciprocation in proportion to the movement of the tool along the blank, or it may be effected by relatively retarding the rotative movement of the blank. In either case the result is to maintain the tool and the cutter in the proper relationship as the tool is fed. The relation between the rotation of the blank and the reciprocating and relieving movements of the tool are continued and the relative timing is so varied that the tool always engages the front edge of the tooth when the tool is in the outer operative position. As the blank rotates to the position shown in Fig. 26 the tool follows the correct relief line 29 to the position shown in Fig. 28.

Having now fully described certain milling cutters embodying my invention, and having also described certain methods whereby the said cutters may be made, I will briefly summarize some of the important features of my improved cutters. A cutter embodying my invention is adapted to accurately cut any predetermined contour and it has its cutting faces inclined with respect to the axis so as to enable each tooth to engage the work gradually and thus effect a shearing cut. The only limitations in the form of the contour are those which are incident to any milling cutter. The contour can consist entirely of straight lines or can consist in part or wholly of circular arcs or non-circular curves. If desired, the cutter may be made to conform exactly to any given former, and the cutter when used will exactly reproduce the contour of the former. There are no errors in the resulting contour which are in any way dependent upon differences in diameter of the cutter at different points along the contour. The cutter may be ground repeatedly upon the inclined or helicoidal front faces of the teeth without changing the effective contour.

What I claim is:

1. A milling cutter for cutting a predetermined contour other than a straight line, comprising a plurality of generally longitudinal teeth each provided with a front cutting face inclined with respect to the cutter axis and having a contour adapted to cut the said predetermined contour, the outer surface of each tooth behind the inclined cutting face being relieved along lines extending backward and inward from the outer edge of the face.

2. A milling cutter for cutting a predetermined contour other than a straight line, comprising a plurality of generally longitudinal teeth each provided with a front cutting face inclined with respect to the cutter axis and having a contour adapted to cut the said predetermined contour, the outer surface of each tooth behind the inclined cutting face being relieved along lines extending backward and inward from the outer edge of the face, whereby the cutter has a distorted shape at axial planes of intersection but is adapted to cut the correct contour when rotated.

3. A milling cutter for cutting a predetermined contour other than a straight line, comprising a plurality of generally longitudinal teeth each provided with a front cutting face inclined with respect to the cutter axis and having a contour adapted to cut the said predetermined contour, the outer surface of each tooth behind the inclined cutting face being relieved along lines extending backward and inward from the outer edge of the face to provide an effective contour behind each cutting face which is the same at successive surfaces of intersection inclined similarly to the initial cutting face, whereby the cutter may be ground on the inclined faces without changing the effective contour.

4. A milling cutter for cutting a predetermined contour other than a straight line, comprising a plurality of generally longitudinal teeth each provided with a helicoidal front cutting face having a contour adapted to cut the said predetermined contour, the outer surface of each tooth behind the helicoidal cutting face being relieved along lines extending backward and inward from the outer edge of the face.

5. A milling cutter for cutting a predetermined contour other than a straight line, comprising a plurality of generally longitudinal teeth each provided with a radial helicoidal front cutting face having a contour adapted to cut the said predetermined contour, the outer surface of each tooth behind the radial helicoidal cutting face being relieved along lines extending backward and inward from the outer edge of the face.

6. A milling cutter for cutting a predetermined contour other than a straight line, comprising a plurality of generally longitudinal teeth each having a helicoidal front cutting face having a contour adapted to cut the said predetermined contour, the outer surface of each tooth behind the helicoidal cutting face being relieved along lines extending backward and inward from the outer edge of the face and conforming to spirals constructed about the cutter axis.

7. A milling cutter for cutting a predetermined contour other than a straight line, comprising a plurality of generally longitudinal teeth each having a helicoidal front cutting face having a contour adapted to cut the said predetermined contour, the outer surface of each tooth behind the helicoidal cutting face being relieved along lines extending backward and inward from the outer edge of the face in definite relation to each other, whereby the cutter has a distorted shape at axial planes of intersection but is adapted to cut the correct contour when rotated.

8. A milling cutter for cutting a predetermined contour other than a straight line, comprising a plurality of generally longitudinal teeth each having a helicoidal front cutting face having a contour adapted to cut the said predetermined contour, the outer surface of each tooth behind the helicoidal cutting face being relieved along lines extending backward and inward from the outer edge of the face and the effective contour behind each cutting face being the same at successive helicoidal surfaces of intersection similar to the initial cutting face, whereby the cutter may be ground on the helicoidal faces without changing the effective contour.

9. A milling cutter for cutting a predetermined contour other than a straight line, comprising a plurality of generally longitudinal but inclined teeth, the forward outer corner of each tooth being in advance of the opposite rear outer corner of the next preceding tooth and each tooth being provided with a helicoidal front cutting face having a contour adapted to cut the said predetermined contour and having the outer surface behind the helicoidal cutting face relieved along lines extending backward and inward from the edge in definite relation to each other, whereby the cutter may be ground on the helicoidal cutting faces without changing the effective contour.

10. A milling cutter for cutting a predetermined contour other than a straight line, comprising a plurality of generally longitudinal but inclined teeth, the forward outer corner of each tooth being in advance of the opposite rear outer corner of the next preceding tooth, and each tooth being provided with a helicoidal front cutting face having a contour which is adapted to cut the said predetermined contour and which is free from any errors resulting from differences in diameter at different positions along the contour, the outer surface of each tooth behind the helicoidal cutting face being relieved along lines extending backward and inward from the outer edge of the face in definite relation to each other, whereby the cutter may be ground on the helicoidal cutting faces without changing the effective contour.

11. A milling cutter for cutting a predetermined contour including non-circular curves, comprising a plurality of generally longitudinal but inclined teeth, the forward outer corner of each tooth being in advance of the opposite rear outer corner of the next preceding tooth, and each tooth being provided with a helicoidal front cutting face having a contour adapted to cut the said predetermined contour and having the outer surface behind the helicoidal cutting face relieved along lines extending backward and inward from the outer edge of the face in definite relation to each other, whereby the cutter may be ground on the helicoidal cutting faces without changing the effective contour.

12. A milling cutter for cutting a predetermined contour other than a straight line, comprising a plurality of generally longitudinal but inclined teeth, the forward outer corner of each tooth being in advance of the opposite rear outer corner of the next preceding tooth, and each tooth being provided with a helicoidal front cutting face having a contour adapted to cut the said predetermined contour and having the outer surface behind the helicoidal cutting face relieved along lines extending backward and inward from the outer edge of the face and conforming to spirals constructed about the cutter axis.

13. A milling cutter comprising a plurality of generally longitudinal but inclined teeth each provided with a helicoidal front cutting face having a contour adapted to cut a contour exactly the same as any predetermined contour on an initial guide or former, the outer surface of each tooth behind the helicoidal cutting face being relieved along lines extending backward and inward from the outer edge of the face in definite relation to each other, whereby the cutter may be ground on the helicoidal cutting faces without changing the effective contour.

14. A milling cutter comprising a plurality of generally longitudinal but inclined teeth, each provided with a helicoidal front cutting face having a contour adapted to cut a contour exactly the same as any predetermined contour on an initial guide or former, the said contour of each tooth being free from any errors resulting from differences in diameter at different positions along the contour and the outer surface of each tooth behind the helicoidal cutting face being relieved along lines extending backward and inward from the outer edge of the face in definite relation to each other whereby the cutter may be ground on the helicoidal cutting faces without changing the effective contour.

15. A milling cutter comprising a plurality of generally longitudinal but inclined teeth, each provided with a helicoidal front cutting face having a contour adapted to cut a contour exactly the same as any predetermined non-circular contour on an initial guide or former, the outer surface of each tooth behind the helicoidal cutting face being relieved along lines extending backward and inward from the face in definite relation to each other, whereby the cutter may be ground on the helicoidal cutting face without changing the effective contour.

In testimony whereof, I hereto affix my signature.

FRIEDERICH MÜLLER.